US012092734B2

(12) United States Patent
Roesler et al.

(10) Patent No.: US 12,092,734 B2
(45) Date of Patent: Sep. 17, 2024

(54) PARTIALLY-LEARNED MODEL FOR SPEED ESTIMATES IN RADAR TRACKING

(71) Applicant: Aptiv Technologies AG, Schaffhausen (CH)

(72) Inventors: Simon Roesler, Neuss (DE); Adrian Becker, Leverkusen (DE); Jan K. Schiffmann, Newbury Park, CA (US)

(73) Assignee: Aptiv Technologies AG, Schaffhausen (CH)

( * ) Notice: Subject to any disclaimer, the term of this patent is extended or adjusted under 35 U.S.C. 154(b) by 349 days.

(21) Appl. No.: 17/644,464

(22) Filed: Dec. 15, 2021

(65) Prior Publication Data

US 2022/0308205 A1 Sep. 29, 2022

Related U.S. Application Data

(60) Provisional application No. 63/265,189, filed on Dec. 9, 2021, provisional application No. 63/169,038, filed
(Continued)

(51) Int. Cl.
*G01S 13/931* (2020.01)
*G01S 3/02* (2006.01)
(Continued)

(52) U.S. Cl.
CPC ............ *G01S 13/931* (2013.01); *G01S 13/58* (2013.01); *G01S 13/89* (2013.01); *G06N 3/02* (2013.01)

(58) Field of Classification Search
CPC ........ G01S 13/931; G01S 13/58; G01S 13/89; G01S 7/415; G01S 13/584; G01S 13/726;
(Continued)

(56) References Cited

U.S. PATENT DOCUMENTS 6,873,251 B2 3/2005 Schiffmann et al.
7,026,979 B2 4/2006 Khosla
(Continued)

FOREIGN PATENT DOCUMENTS

DE 102013011239 A1 1/2015
WO 2020113160 6/2020
(Continued)

OTHER PUBLICATIONS

"Extended European Search Report", EP Application No. 22159342.9, Aug. 26, 2022, 9 pages.
(Continued)

*Primary Examiner* — Timothy A Brainard
*Assistant Examiner* — Ismaaeel A. Siddiquee
(74) *Attorney, Agent, or Firm* — Harness, Dickey & Pierce, P.L.C.

(57) ABSTRACT

This document describes techniques and systems for a partially-learned model for speed estimates in radar tracking. A radar system is described that determines radial-velocity maps of potential detections in an environment of a vehicle. The model uses a data cube to determine predicted boxes for the potential detections. Using the predicted boxes, the radar system determines Doppler measurements associated with the potential detections that correspond to the predicted boxes. The Doppler measurements are used to determine speed estimates for the predicted boxes based on the corresponding potential detections. These speed estimates may be more accurate than a speed estimate derived from the data cube and the model. Driving decisions supported by the speed estimates may result in safer and more comfortable vehicle behavior.

15 Claims, 6 Drawing Sheets

Related U.S. Application Data on Mar. 31, 2021, provisional application No. 63/166,108, filed on Mar. 25, 2021.

(51) Int. Cl.
*G01S 13/58* (2006.01)
*G01S 13/89* (2006.01)
*G06N 3/02* (2006.01)

(58) Field of Classification Search
CPC .. G01S 13/66; G01S 7/42; G06N 3/02; G06N 3/08; G06N 20/00
See application file for complete search history.

(56) References Cited

U.S. PATENT DOCUMENTS

| | | |
|---|---|---|
| 9,240,053 B2 | 1/2016 | Mathews et al. |
| 9,983,301 B2 | 5/2018 | Liu et al. |
| 10,451,712 B1 | 10/2019 | Madhow et al. |
| 11,852,746 B2 | 12/2023 | Harrison |
| 2005/0001759 A1 | 1/2005 | Khosla |
| 2012/0056772 A1* | 3/2012 | Jaffer ................. G01S 13/003 342/99 |
| 2013/0006577 A1 | 1/2013 | Mathews et al. |
| 2015/0198711 A1 | 7/2015 | Zeng et al. |
| 2016/0103214 A1* | 4/2016 | Clark ................. G01S 13/723 342/59 |
| 2018/0082137 A1 | 3/2018 | Melvin et al. |
| 2018/0120429 A1 | 5/2018 | Bialer |
| 2018/0261095 A1 | 9/2018 | Qiu et al. |
| 2018/0275265 A1 | 9/2018 | Bilik et al. |
| 2018/0356498 A1* | 12/2018 | Stachnik ............. G01S 7/2921 |
| 2019/0107615 A1 | 4/2019 | Eljarat et al. |
| 2019/0120955 A1 | 4/2019 | Zhong et al. |
| 2020/0175315 A1 | 6/2020 | Gowaikar et al. |
| 2020/0333455 A1 | 10/2020 | Longman et al. |
| 2021/0103027 A1 | 4/2021 | Harrison |
| 2021/0389420 A1* | 12/2021 | Roger ................. G01S 13/34 |
| 2022/0196798 A1* | 6/2022 | Chen ................. G01S 13/89 |
| 2022/0283288 A1* | 9/2022 | Yu .................... G01S 7/35 |
| 2023/0046274 A1 | 2/2023 | Chen et al. |
| 2023/0139751 A1 | 5/2023 | Sanderovich et al. |

FOREIGN PATENT DOCUMENTS

| | | |
|---|---|---|
| WO | 2020113166 | 6/2020 |
| WO | 2020146428 | 7/2020 |

OTHER PUBLICATIONS

"Extended European Search Report", EP Application No. 22159816.2, Aug. 29, 2022, 8 pages.

"Extended European Search Report", EP Application No. 20187674.5, Dec. 4, 2020, 11 pages.

"Frequency-Modulated Continuous-Wave Radar (FMCW Radar)", Retrieved at: https://www.radartutorial.eu/02.basics/Frequency%20Modulated%20Continuous%20Wave%20Radar.en.html—on Jul. 23, 2021, 6 pages.

Adavanne, et al., "Direction of Arrival Estimation for Multiple Sound Sources Using Convolutional Recurrent Neural Network", Aug. 5, 2018, 6 pages.

Bengtsson, "Models for tracking in automotive safety systems", Licentiate thesis, 2008, Jan. 2008, 189 pages.

Bialer, et al., "Performance Advantages of Deep Neural Networks for Angle of Arrival Estimation", Feb. 17, 2019, 5 pages.

Brooks, et al., "Complex-valued neural networks for fully-temporal micro-Doppler classification", Jun. 2019, 10 pages.

Kellner, "Instantaneous Full-Motion Estimation of Arbitrary Objects using Dual Doppler Radar", Jun. 2014, 6 pages.

Kellner, et al., "Tracking of Extended Objects with High Resolution Doppler Radar", Dec. 2015, 13 pages.

Krim, "Two Decades of Array Signal Processing Research: The Parametric Approach", Jul. 1996, pp. 67-94.

Liu, et al., "Direction-of-Arrival Estimation Based on Deep Neural Networks With Robustness to Array Imperfections", Oct. 2018, 13 pages.

Schlichenmaier, et al., "Clustering of Closely Adjacent Extended Objects in Radar Images using Velocity Profile Analysis", Apr. 2019, 5 pages.

Schlichenmaier, et al., "Instantaneous Actual Motion Estimation with a Single High-Resolution Radar Sensor", Apr. 2018, 5 pages.

Swindlehurst, et al., "Application Of Music To Arrays With Multiple Invariances", Jun. 2000, pp. 3057-3060.

\* cited by examiner

PARTIALLY-LEARNED MODEL FOR SPEED ESTIMATES IN RADAR TRACKING

CROSS-REFERENCE TO RELATED APPLICATIONS

This application claims the benefit under 35 U.S.C. 119(e) of U.S. Provisional Application No. 63/265,189, filed Dec. 9, 2021, U.S. Provisional Application No. 63/169,038, filed Mar. 31, 2021, and U.S. Provisional Application No. 63/166,108, filed Mar. 25, 2021, the disclosures of which are hereby incorporated by reference in their entirety herein.

BACKGROUND

A perception system for a vehicle (e.g., an advanced-safety or automated-driving system) may rely on an output from a radar tracker. A radar tracker for a multiple-input-multiple-output (MIMO) radar system may output radar tracks to objects derived from analysis of complex radar data (e.g., data cubes, detection lists) that characterizes radar returns detected with a MIMO array, over multiple frames. A radar tracker may provide a perception system with estimated speeds, as timely and accurately as possible to support safe vehicle operations. Given the complexity of the task, some radar trackers may not accurately report information about objects tracked in an environment or if accurate, may not report the information timely, which may fail to provide adequate situational awareness to a vehicle in many common driving scenarios.

SUMMARY

This document describes techniques and systems for a partially-learned model for speed estimates in radar trackers. In one example, a method includes generating, from radar signals, a data cube that represents an environment of a vehicle, and determining, based on the radar signals or the data cube, radial-velocity maps of potential detections in the environment. The method further includes using a model applied to the data cube to determine predicted boxes. Doppler measurements associated with groups of the potential detections associated with each of the predicted boxes are also determined. The Doppler measurements associated with the groups of the potential detections determined for each of the predicted boxes are used to determine speed estimates for each of the predicted boxes. The speed estimates for the predicted boxes are provided as an input to an autonomous-driving system or an assisted-driving system that operates the vehicle on a roadway. By incorporating the measured radial velocities into the determination of the speed estimates, speed regression of the described method by the described model is improved. In this way, the measured radial velocity data is incorporated into the processing pipeline of the described radar system in a non-learned fashion.

In another example, a system includes at least one processor configured to perform the above-summarized method. Other examples set forth herein are directed to systems and components, including systems with means for performing these methods.

This Summary introduces simplified concepts for a partially-learned model for speed estimates in radar systems, for example, automotive (e.g., vehicle) applications requiring object tracking, as well as other examples of object tracking, as further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of a partially-learned model for speed estimates in radar trackers are described in this document with reference to the following figures. The same numbers are often used throughout the drawings to reference like features and components, including hyphenated numbers to designate variations of the like features and components previously shown:

FIGS. 4-1 and 4-2 illustrate conceptual diagrams of example computer architectures including a partially-learned model of a radar system for speed estimates in accordance with techniques of this disclosure.

DETAILED DESCRIPTION

Overview

A perception system may rely on a radar tracker to provide situational awareness and detect objects of interest in an environment of a vehicle. A radar system may include a multiple-input-multiple-output (MIMO) antenna array that interfaces to a monolithic-microwave-integrated-circuit (MMIC), which obtains radar returns reflecting from objects detected by the MIMO and conveys those returns as radar data. From the radar data output by the MMIC for a frame, a radar processor can identify a data cube and/or lists of detections for that frame.

Each detection contains information for deriving a position and range rate of a radar-reflective portion of a detected object. Whereas, a data cube organizes most if not all radar returns obtained by a MIMO array from one frame, into a two-dimensional (2D) data cube representation of the radar data, having a range-Doppler plane per each receive channel of the MIMO array. This enables formation of a three-dimensional (3D) data cube representation of the MMIC output into a one-dimensional effective receive array, or a four-dimensional (4D) data cube representation of the MMIC output into a 2D effective receive array. Some radar processors may perform additional processing to the receive channels for including in the data cubes, additionally, 1D angular response measurements (e.g., azimuth or elevation) or 2D angular response measurements (e.g., azimuth and elevation). Lists of detections may be determined apart from forming a data cube, and in some cases, detection lists are derived from the formation of data cubes. In either case, converting radar data to detections is a preprocessing step that is often required before traditional radar tracking can take place. With advancements in computing technology, model based trackers can instead analyze these complex sets of data cubes directly to recognize certain classes of objects and estimate object measurements faster than can be estimated from using detections.

A model based tracker may include a machine-learned network that is trained to analyze a sequence of data cubes or sparse subsets thereof, for identifying specific types or classes of objects in an environment, which the network is trained to recognize. The model based tracker reports a periodic list of modeled measurements (e.g., machine-learned measurements), which contain estimates of certain properties of entire objects found by the machine-learned network from direct analysis of the data cubes. With reference to a host vehicle, some estimates include range, angle, and velocity. In addition, the model based tracker can output a bounding box that conveys position of an object, orientation of the object, as well as other information that the network can infer from the data cube.

Many vehicle-based systems require high resolution radar data (e.g., in range, angle, and velocity) for objects being tracked. As described above, performance of some radar trackers can be improved using a computer model (e.g., a machine-learned network) programmed or trained to directly analyze data cubes. Although, for this purpose, some radar systems may use a neural network (e.g., a radar deep object recognition network), the neural network generally aggregates features from consecutive frames that can correspond to object displacement. As such, neural networks can predict object velocities to some extent, however, these estimates are typically not to the desired accuracy for safe driving. Accuracy of object-localization may be compromised by poor cross-range resolution of the neural network. Although, some radar trackers can fairly and accurately measure a radial component of an object's speed (e.g., relative to the host vehicle's motion) from analyzing radar detections, model based trackers, including neural networks, do not efficiently use all information in a data cube, and may struggle to produce reliable radial-velocity data from a radar signal.

This document describes techniques and systems for a partially-learned model for speed estimates in radar tracking. A radar system is described that determines radial-velocity maps of detections in an environment of a vehicle using a data cube. A model uses the data cube to determine predicted boxes for potential objects. The radar system determines Doppler measurements associated with detections that are observed at locations within boundaries of the predicted boxes. The Doppler measurements are used to determine speed estimates for the potential object, including modified or different estimated speeds and velocities than what is inferred by the model. Driving decisions supported by more accurate estimates may result in safer and more comfortable vehicle behavior. The radar output from the example radar system overcomes problems of inferior object-speed estimations by directly incorporating measured Doppler velocities of detections, into the processing pipeline executing the model, and in a non-learned fashion. In addition, the example radar system may more accurately determine the speed of objects.

Improving the accuracy and fidelity of a radar output without adding latency or extra hardware may improve operations of perception systems that rely on the radar output. An autonomous-driving or assisted-driving system may rely on an output from the described radar system to safely maneuver a vehicle.

Operating Environment

Figure 1:
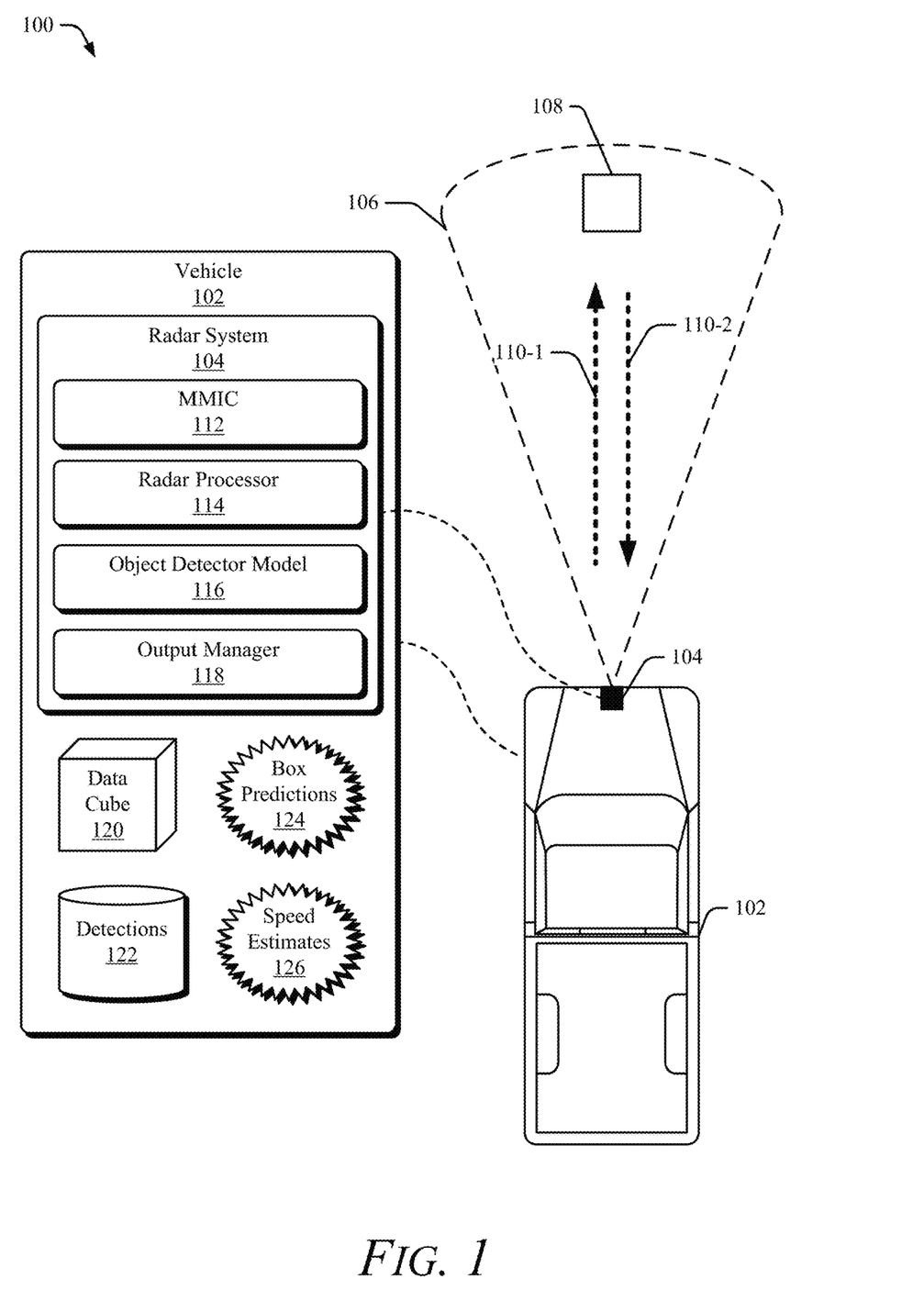
FIG. 1 illustrates an example environment for a partially-learned model for speed estimates in radar systems in accordance with techniques of this disclosure.

FIG. 1 illustrates an example environment 100 for a partially-learned model for speed estimates in radar systems in accordance with techniques of this disclosure. In the depicted environment 100, a vehicle 102 travels on a roadway, on or near which a wide variety of objects are free to move and impact driving. Although illustrated as a passenger truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane, spacecraft), and the like. The vehicle 102 relies on a perception system, including a radar system 104, for avoiding objects while driving the vehicle 102 among them in the environment 100.

The radar system 104 outputs radar dada, including indications of objects detected in a field of view 106. For example, the radar data may alert advanced-safety or autonomous-driving systems of the vehicle 102 of an object 108 that is in a driving path of the vehicle 102. The radar system 104 can be installed on, mounted to, or integrated with any part of the vehicle 102, such as in a front, back, top, bottom, or side portion of the vehicle 102, a bumper, a side mirror, part of a headlight and/or tail light, or at any other interior or exterior location of the vehicle 102 where object detection using radar is desired. The radar system 104 may include multiple radar devices or multiple radar systems that coordinate to act as a single provider of the field-of-view 106. The radar system 104 is primarily described as a MIMO radar system, however the radar tracking techniques described herein are not necessarily limited only to MIMO radar systems and may be applied for radar tracking in other types of radar systems.

The radar system 104 can include a combination of hardware components and software components executing thereon. For example, a computer-readable storage media (CRM) of the radar system 104 may store machine-executable instructions that, when executed by a processor, cause the radar system 104 to output information about objects detected in the field of view 106. One example combination of hardware and software components of the radar system 104 includes a MMIC 112, at least one radar processor 114, an object detector model 116, and an output manager 118. The radar system 104 may include other components not shown. For example, for simplicity of the Drawings, an antenna of the radar system 104 is not shown, however, the radar system 104 is configured to couple or include an antenna, such as a MIMO antenna array.

The MMIC 112 processes radar signals, which may include one or more of: signal mixing for up-conversion of an analog signal to radar frequencies, power amplification of the up-converted signal, and signal routing to an antenna (not shown in FIG. 1) for transmission (e.g., radar signal 110-1). Alternatively or additionally, the MMIC 112 receives a reflection (e.g., radar return 110-2) by way of the antenna, down-converts the signal to an intermediate frequency (IF) signal, and routes the IF signal to other components (e.g., the radar processor 114) for further processing and analysis.

The MMIC 112 of the radar system 104 includes an interface to an appropriate antenna, and during each frame of time, the MMIC 112 transmits radar signals 110-1 via the antenna to radiate objects in the field of view 106. The MMIC 112 receives radar returns 110-2 via the antenna as reflected versions of the radar signals 110-1 transmitted for that frame. The MMIC 112 transforms the radar returns 110-2 into a digital format enabling the radar system 104 to quickly establish tracks to objects in the field of view 106.

The radar processor 114 (also simply referred to as "the processor 114"), the object detector model 116, and the output manager 118 are configured to process the radar returns 110-2 digitized by the MMIC 112 into various forms of other radar data, some of which is maintained for internal use by the radar system 104, and some of which is generated for use by other systems of the vehicle 102 (outside the radar system 104). Forms of the radar data can include a data cube 120, detections 122, box predictions 124, and speed estimates 126. The radar data can be used by the radar system 104 to generate one or more tracks, e.g., for conveying the box predictions 124 and/or speed estimates 126 of the object 108 or other objects in the field-of-view 106.

For clarity, the environment 100 shows the radar processor 114 as a single processor, but various implementations can include multiple processors. To illustrate, the radar processor 114 may include a signal processor (SP) and a data processor (DP) for different processing tasks. The SP, as one example, performs low-level processing, such as Fast Fourier Transforms (FFTs), identifying targets of interest for the DP, generating a range-Doppler map, and so forth, while the DP performs high-level processing, such as tracking, display updates, user interface generation, and so forth. The radar processor 114 processes digital microwave and/or radar signals (e.g., the IF signal). This can include scheduling and configuring radar signal transmissions to create a field-of-view (e.g., the field of view 106) with a particular size, shape, and/or depth. The radar processor 114, for instance, generates digital representations of signal transmissions that are fed into a digital-to-analog converter (DAC) and upconverted to radar frequencies for transmission. In aspects, a DAC (not shown in FIG. 1) may be integrated with the MMIC 112, integrated with the radar processor 114 as part of an SoC, or be included in the radar system 104 as a stand-alone component. Alternatively or additionally, the radar processor 114 receives and processes a digitized version of a reflected radar signal by way of an analog-to-digital converter (ADC), such as a digitized IF signal generated by the MMIC 112 from the radar return 110-2. In a similar manner to the DAC, an ADC may be integrated with the MMIC 112, integrated with the radar processor 114 as part of an SoC, or be included in the radar system 104 as a stand-alone component.

The processor 114 generates the data cube 120, which represents a collection of measurements related to the digitized radar returns 110-2 obtained from the MMIC 112 during one frame. In this MIMO example, receive channels of the radar system 104 are processed into a 2D (two-dimensional) data cube 120 including a range-Doppler plane per channel, which results in a 3D (three-dimensional) data cube 120 for a 1D (one-dimensional) effective receive antenna array, or a 4D (four-dimensional) data cube 120 for a 2D (two-dimensional) effective receive antenna array. The data cube 120 may also contain other information obtained from further processing, such as information about a particular 1D or 2D angular response (e.g., elevation, azimuth, a combination of elevation and azimuth).

In addition, based on the data cube 120 or based directly on the digitized radar returns 110-2 obtained from the MMIC 112, the processor 114 generates the detections 122. A single detection or group of the detections 122 can indicate a radial range rate to effective radar returns 110-2 (scatters) on the object 108 in the environment 100. The detections 122 may have errors in position (e.g., range, azimuth angle), however, many of the detections 122 indicate accurate and high-quality radial range rates for tracking. The processor 114 can isolate the detections 122 from false detections and noise through thresholding and non-maximal suppression of radar energy in a range-Doppler plane (e.g., by peak-finding in that plane) associated with the radar return 110-2. For each range bin of the data cube 120, the processor 114 may estimate a noise level for the radar system 104 by averaging the Doppler bin. A detection threshold may be used to separate noise and false alarms from actual or possible detections. Although this detection process may lose some information from the radar return 110-2 and/or the data cube 120, this reduction in quantity of the detections 122 can significantly reduce the complexity of processing performed by the output manager 118, which may correlate to an increase in speed and responsiveness of the radar system 104.

The object detector model 116 is a computer model programmed or trained (e.g., using machine-learning or neural-network techniques) to recognize objects from the data cube 120, including the box predictions 124 and the speed estimates 126, such as those associated with the object 108. The object detector model 116 can discard or ignore portions of the data cube 120 that are not recognizable. The object detector model 116 may be a machine-learned model, such as a neural network or a regression neural network, trained to recognize the objects 108 in the environment 100. In analyzing and reporting the box predictions 124, the object detector model 116 allows the output manager 118 to fuse measured radial velocities associated with the detections 122 with the box predictions 124 to provide more accurate speed estimates 126 associated with the objects 108.

The output manager 118 resolves the detections 122 with the box predictions 124 to improve resolution or accuracy of the speed estimates 126 initially output from the object detector model 116. Grid segmentations and point segmentations associated with the detections 122 may be determined. The detections 122 that are at or near boundaries of the box predictions 124 may be utilized by the output manager 118 to improve fidelity or preciseness of the speed estimates 126 that are output for use by the vehicle 102. In this way, the speed estimates 126 may be modified after being output by the object detector model 116 to include a more accurate estimate based on information from the detections 122, not just from the object detector model 116 processing the data cube 120. The output manager 118 may send radar tracks over a communication link that convey the speed estimates 126 and the box predictions 124 as values populating fields of the tracks. A control interface may communicate the speed estimates 126 to vehicle-based systems to enable driving decisions based on the objects 108 detected in the environment 100.

Vehicle Configuration

Figure 2:
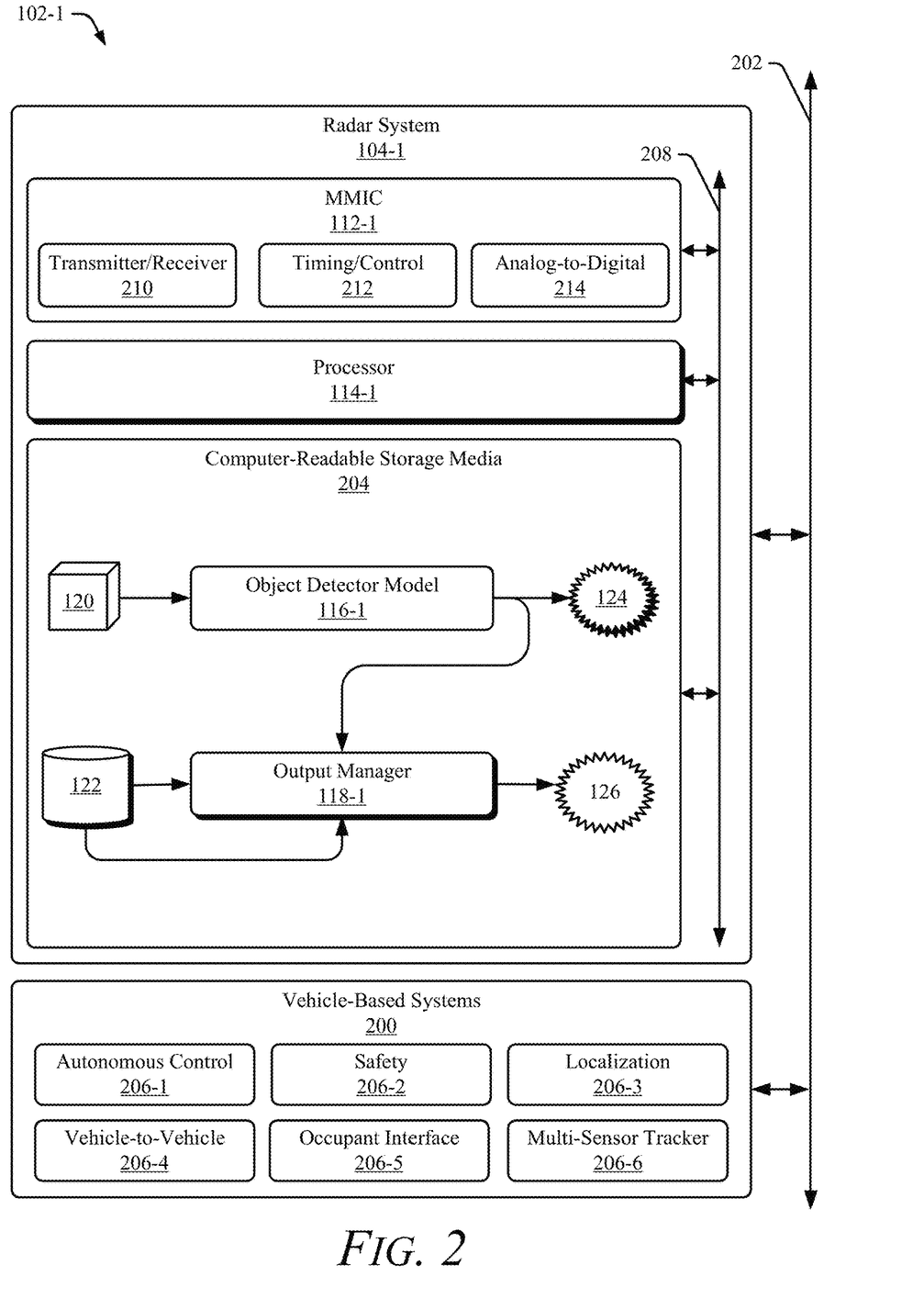
FIG. 2 illustrates an example configuration of a portion of a vehicle with a partially-learned model for speed estimates in a radar system.

FIG. 2 illustrates an example configuration of a portion of a vehicle 102-1 with a partially-learned model for speed estimates in a radar system 104-1. The vehicle 102-1 is an example of the vehicle 102 illustrated in FIG. 1.

Included in the vehicle 102-1 is a radar system 104-1, which is an example of the radar system 104, shown in greater detail. The vehicle 102-1 also includes vehicle-based systems 200 that are operatively and/or communicatively coupled to the radar system 104-1 via link 202, which may be one or more wired and/or wireless links including vehicle-based network communications for interconnecting the components of the vehicle 102-1. In some examples, the link 202 is a vehicle communication bus.

The vehicle-based systems 200 use vehicle data, including radar data provided on the link 202 by the radar system 104-1, to perform vehicle-based functions, which in addition to other functions may include functions for vehicle control. The vehicle-based systems 200 can include any conceivable device, apparatus, assembly, module, component, subsystem, routine, circuit, processor, controller, or the like, that uses radar data to act on behalf of the vehicle 102-1. As some non-limiting examples, the vehicle-based systems 200 may include a system for autonomous control 206-1, a system for safety 206-2, a system for localization 206-3, a system for vehicle-to-vehicle communication 206-4, a system for use as an occupant interface 206-5, and a system for use as a multi-sensor tracker 206-6. Upon receipt of the radar data, functions provided by the vehicle-based systems 200 use portions of the radar data, including estimated measurements of objects detected in the field-of-view 106, to configure the vehicle 102-1 to safely drive without colliding with the detected objects.

For example, radar tracks having fields of information conveying the speed estimates 126 and/or the box predictions 124 are examples of the radar data that is output on the link 202 to the vehicle-based systems 200. This information about movement of the object 108, such as a velocity, position, and the like, may enable the vehicle-based systems 200 to control or assist with braking, steering, and/or accelerating the vehicle 102-1 to avoid a collision with the object 108. The system for autonomous control 206-1 can use the radar output received via the link 202 to autonomously or semi-autonomously drive the vehicle 102-1 safely on a road. The system for use as an occupant interface 206-5 can use the information output from the radar system 104-1 to allow an operator or passengers to have situational awareness to make driving decisions or provide operator inputs to a controller for providing more buffer to avoid the objects. The radar data output on the link 202 may be provided to other vehicles or infrastructure using the system for vehicle-to-vehicle or infrastructure communication 206-4 (e.g., V2V, V2X), which allows operators, passengers, or controllers of other vehicles to also avoid the objects being tracked or have confidence that the vehicle 102-1 is aware of their presence based on receipt of the radar data. By improving situational awareness for the vehicle 102-1 and other vehicles in the environment 100 using the radar data from the radar system 104-1, the vehicle 102-1 can drive in a safe manner under manual, autonomous, or semi-autonomous control.

The radar system 104-1 includes a MMIC 112-1, as an example of the MMIC 112. The MMIC 112-1 includes transmitter/receiver elements 210, timing/control elements 212, and analog-to-digital converters 214. For simplicity in the Drawings, omitted from FIG. 2 is an antenna array (e.g., MIMO antenna array) that is also part of the radar system 104-1 and operatively coupled to the transmitter/receiver elements 210.

The transmitter/receiver elements 210 are configured to transmit electromagnetic (EM) signals using one or more components for emitting EM energy. Using one or more components for receiving EM energy, the transmitter/receiver elements 210 are configured to receive reflections in response to objects that reflect the emitted EM energy. The transmitter/receiver element 210 can be configured as a transceiver configured as a single component (e.g., chip) to perform both transmission and reception. For example, the components for emitting EM energy enable the field of view 106 to be radiated by transmitting the radar signals 110-1. The radar returns 110-2 represent reflections of the EM energy radiated with the radar signals 110-1; the components for receiving EM energy enable reception of the radar returns 110-2, which may enable objects to be detected and tracked in the field of view 106.

The timing/control elements 212 perform operations that adjust characteristics of the radar signals 110-1 (e.g., frequency, gain, phase, period) being transmitted, or operations for receiving radar returns 110-2 in a way that is effective for radar tracking using the particular antenna and radar design. For example, the timing/control elements 212 cause the transmitter/receiver elements 210 to adjust a size, a shape, antenna pattern, or other characteristic of the radar system 104-1 to transmit the radar signals 110-1 using multiple transmitters, and multiple receivers to capture more information from the radar returns 110-2 during each frame, enabling radar tracking high resolution.

The analogue-to-digital converters 214 convert the radar returns 110-2 obtained from the transmitter/receiver elements 210 into a digital format that can be used for generating data cubes, detections, and enable other radar processing. The MMIC 112-1 outputs the digitized radar returns 110-2 over a link 208, which represents an internal communication link between components of the radar system 104-1. The link 208 may be wired or wireless and enables internal representations of radar data (e.g., the data cube 120, the detections 122) to be exchanged within the radar system 104-1 before appearing as radar outputs or tracks on the link 202.

Operatively coupled to the MMIC 112-1 and the link 208, the radar system 104-1 also includes at least one processor 114-1, which is an example of the radar processor 114. Some examples of the processor 114-1 include, a controller, a control circuit, a microprocessor, a chip, a system, a system-on-chip, a device, a processing unit, a digital signal processing unit, a graphics processing unit, and a central processing unit. The processor 114-1 can be any component configured to process frames of digitized versions of the radar returns 110-2 obtained from the MMIC 112-1 to convey objects in the environment 100. The processor 114-1 may include multiple processors, one or more cores, embedded memory storing software or firmware, a cache or any other computer element that enables the processor 114-1 to execute machine-readable instructions for generating an output from the radar system 104-1.

Machine-readable instructions that are executed by the processor 114-1 can be stored by a computer-readable media (CRM) 204 of the radar system 104-1. The CRM 204 may also be used to store data managed by the processor 114-1 during execution of the instructions. In some examples, the CRM 204 and the processor 114-1 are a single component, such as a system on chip including the CRM 204 configured as a dedicated memory for the processor 114-1. In some examples, access to the CRM 204 is shared by other components of the radar system 104-1 (e.g., the MMIC 112-1) that are connected to the CRM 204, e.g., via the link 208. The processor 114-1 obtains instructions from the CRM 204; execution of the instructions configure the processor 114-1 to perform radar operations, such as radar tracking, which result in communication of a radar output (e.g., radar tracks) to the vehicle-based systems 200 and other components of the vehicle 102-1 over the link 202.

In this example, the CRM 204 includes instructions for configuring the processor 114-1 to generate the data cube 120 and to generate the detections 122. For example, the data cube 120 is determined from the radar data received from the analog-to-digital converter 214 of the MMIC 112-1 and the detections 122 can be determined from this same digitized radar data, or from further processing of the data cube 120.

The CRM further includes instructions that configure the processor 114-1 to execute an object detector model 116-1, which infers boundaries and an orientation of the box predictions 124 as indications of objects recognized from the input of the data cube 120. The object detector model 116-1 is an example of the object detector model 116, which when executed by the processor 114-1, may determine an estimated speed associated with each of the box predictions 124 for eventual inclusion in the output of the radar system 104-1. There may not be high-confidence in this speed estimate reported by the object detector model 116-1. Before reporting the box predictions 124 in tracks that are output to the vehicle-based systems 200, these modeled speed estimates may be modified. The estimated speeds 126 that are reported with the box predictions 124 can be adjusted to be more accurate than the estimates from the object detector model 116-1, in furtherance of enabling safe operations with the vehicle-based systems 200 that rely on them.

The CRM 204 further includes instructions for configuring the processor 114-1 to execute the output manager 118-1 and modify the modeled speed estimates to generate the speed estimates 126, using information from the detections 122 derived outside or separate from execution of the object detector model 116-1. The output manager 118-1 can resolve the detections 122 with the box predictions 124 to improve the speed estimates 126 that are output from the radar system 104-1.

For example, when executed by the processor 114-1, the object detector model 116-1 receives a sequence of data cubes, including the data cube 120. The object detector model 116-1 may output the box predictions 124 on the link 208 as internal data managed by the processor 114-1 and stored on the CRM 204. The box predictions 124 are each localizations of objects of a particular object class or object type that the object detector model 116-1 is specifically trained or programmed to recognize. The box predictions 124 can include detailed information indicating object class, position, size, orientation, and shape; and with less accuracy, information about heading and speed (e.g., velocity) is included in the box predictions 124. Although the object detector model 116-1 may fail to recognize some types of objects, information about objects for the box predictions 124 that are recognized, are maintained by the CRM 204 for use by the output manager 118-1 generating a radar output, such as radar tracks.

Typically, at least one group of the detections 122 corresponds to each of the box predictions 124. The detections 122 (or groups of the detections 122) may be far more numerous than a quantity of objects that the object detector model 116-1 is able to discern from the data cube 120. Some of the detections 122 or groups of the detections 122 convey noise, and others are caused by reflections from objects of a type or class beyond which is recognizable to the object detector model 116-1. Additional detail for an object associated with the box predictions 124 may be derivable from the detections 122 that correspond. For example, the detections 122 may include information not considered by the object detector model 116-1 during the analysis of the data cube 120. This detection based information may be used to improve the speed estimates 126 generated for each of the box predictions 124, which are initialized by the object detector model 116-1.

The output manager 118-1 receives the box predictions 124 and the detections 122. From these inputs, the output manager 118-1 generates the speed estimates 126, which improve upon speed estimates modeled for the box predictions 124, as received from the object detector model 116-1. From comparing the inputs it receives, the output manager 120-1 determines whether to use any information from the detections 122 to update, correct, or improve the speed or direction (e.g., velocity) estimated by the object detector model 116-1 for each of the box predictions 124.

In this way, the output manager 118-1 causes the radar system 104-1 to take full advantage of the high quality abilities of the object detector model 116-1 that processes the data cube 120 to quickly and accurately determine object class, position, size, and orientation. In addition, the output manager 118-1 enables high quality range rates of the detections 122 to be used to further improve tracking in the environment 100, including by improving the speed estimates 126 (e.g., the velocity vectors) of detected objects, using information otherwise ignored or not relied on by the object detector model 116-1.

While the object detector model 116-1 is executing at the processor 114-1, the data cube 120 produced as an input for the object detector model 116-1 from the reflect radar signals 110-2 is maintained in a memory or register of the processor 114-1 or at the CRM 204. In particular, the radar system 104-1 emits the radar signal 110-1 and receives the reflected radar return 110-2. From the reflected radar return 110-2, the data cube 120 is generated so the object detector model 116-1 may analyze the return 110-2. Also generated from the radar return 110-2 or from the data cube 120, are the detections 122, which are likewise maintained in a memory or register of the processor 114-1 or at the CRM 204. The object detector model 116-1 does not receive these detections 122, however, the output manager 118-1 is given access to the detections 122 to use for improving an output from the radar system 104-1, including the speed estimates 126 for the box predictions 124 that populate fields of radar tracks.

The object detector model 116-1 retrieves the data cube 120 to produce the box predictions 124. The box predictions 124 provide Doppler measurements estimated by the object detector model 116-1, for objects in the environment 100. These, as well as the detections 122, are provided to the output manager 118.

The output manager 118 also executes at the processor 114. The output manager 118 receives the box predictions 124 and infers radial velocities associated with the detections 122. The output manager 118 can fuse the box predictions 124 and the radial velocities to determine the speed estimates 126 associated with the box predictions 124 as more accurate predictions than estimated speeds for the box predictions 124 being reported by the object detector model 116-1.

In this way, the radar system 104 outputs, including the speed estimates 126, highly accurate radar data for one or more objects 108 in the environment 100. The radar output may appear similar to outputs from other radar systems; however, the speed estimates 126 may be more accurate. Through adoption of the described techniques, radial velocity measurements can be considered during radar processing for enhancing capabilities of a neural network (e.g., the object detector model 116 and/or the output manager 118). Improving the accuracy and fidelity of a radar output in this way may improve operations of perception systems and the vehicle-based systems 200 that rely on the radar output. The vehicle-based systems 200 of the vehicle 102-1 may rely on the radar system 104-1, and the speed estimates 126 of high accuracy that are output quickly, to safely maneuver the vehicle 102-1 on the road. Driving decisions supported by the radar system 104-1 may result in safe and comfortable vehicle behavior.

Example Process

Figure 3:
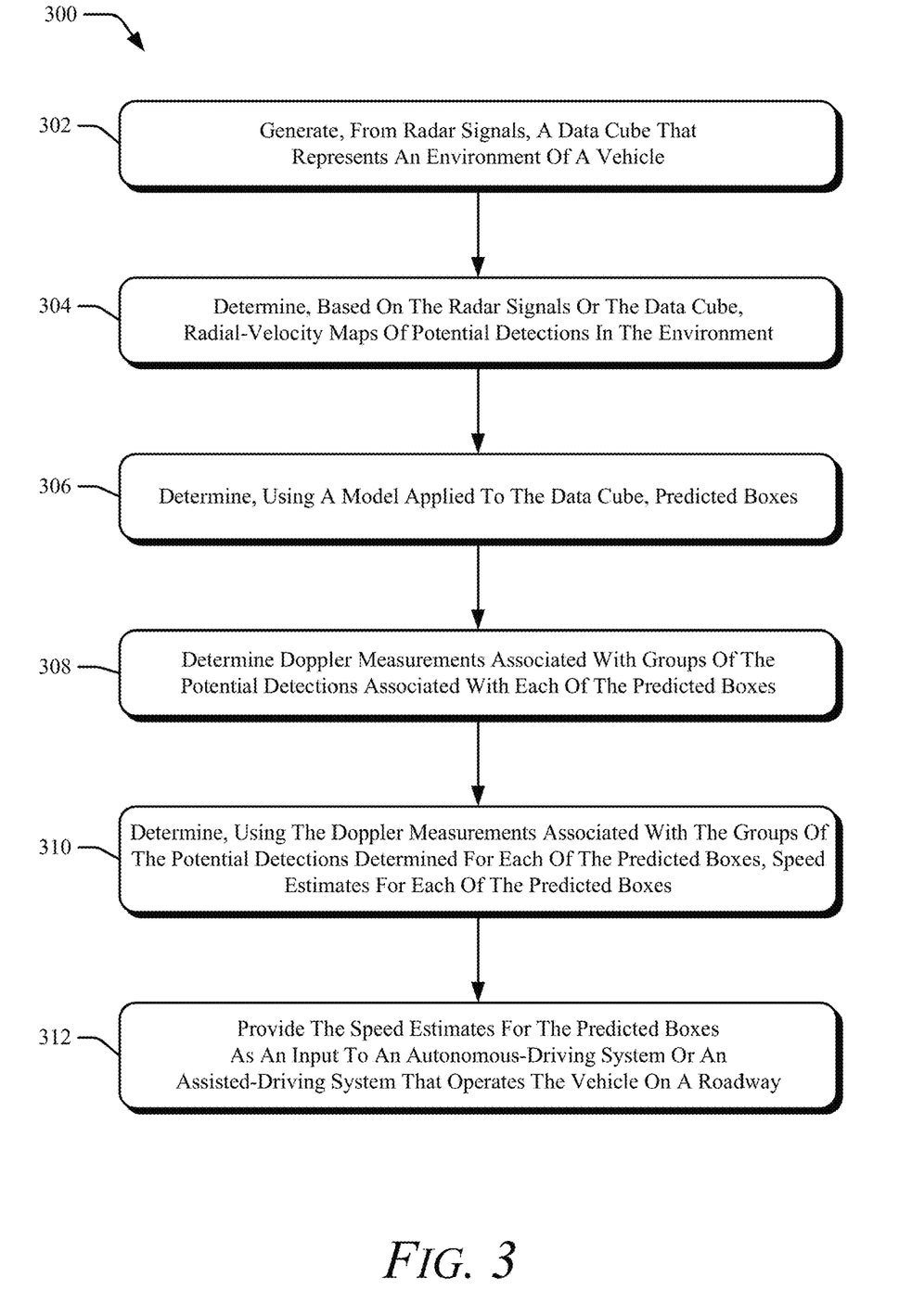
FIG. 3 illustrates a flow diagram of an example process performed by a partially-learned model for speed estimates in a radar system in accordance with techniques of this disclosure.

FIG. 3 illustrates a flow diagram of an example process performed by a partially-learned model for speed estimates in a radar system in accordance with techniques of this disclosure. For ease of description, the process 300 is described primarily in the context of being performed by the radar system 104 of FIG. 1. The operations (also referred to as steps) of the process 300 may be rearranged, skipped, repeated, or performed in different ways than the specific flow shown in the diagram.

At 302, a data cube that represents an environment of a vehicle is generated from radar signals. For example, the processor 114 can produce the data cube 120 from the reflected radar return 110-2. The data cube 120 represents the environment 100 of the vehicle 102. The data cube 120 generally includes at least three dimensions, including as examples range data, angle data, and radial velocity data for the detections 122.

At 304, radial-velocity maps of potential detections in the environment of the vehicle are determined based on the radar signals or the data cube. The radial-velocity maps include radial velocity and Doppler data for the potential detections inferred from the radar signals. For example, the processor 114 can use the reflected radar return signal 110-2 or the data cube 120 to produce the detections 122, including a radial velocity component for each. By organizing the detections 122 by position, the processor 114 can produce radial-velocity maps of the detections 122. As described in more detail with respect to FIG. 4, the radial-velocity maps include radial-velocity data and Doppler data for the detections 122. The radial-velocity maps can be two-dimensional and include at least maximum values and maximum absolute values. The processor 114 can also perform a polar to cartesian transformation on the radial-velocity maps of the detections 122 resulting in transformed radial-velocity maps. The processor 114 can also generate a fusion of coordinates for the transformed radial-velocity maps. The fusion of coordinates maintains a radial-velocity value with a largest magnitude for a given angle for each of the detections 122.

At 306, predicted boxes are determined using a model applied to the data cube. For example, the object detector model 116 can produce the box predictions 124 as the predicted boxes derived from the data cube 120. The object detector model 116 can be a neural network, convolutional neural network, recurrent neural network, modular neural network, or long short-term memory network. The box predictions 124 may each represent a unique object recognized by the object detector model 116. The object detector model 116 may model object measurements, such as size, location, orientation, and class, in generating the box predictions 124. Other properties can be modeled, some having less accuracy.

At 308, Doppler measurements associated with groups of the potential detections associated with each of the predicted boxes are determined. For example, the output manager 118 can determine Doppler measurements associated with groups of the detections 122 that localize to the box predictions 124. The Doppler measurements result in a list of measured radial velocities, which are produced independent of the output from the object detector model 116, for each of the box predictions 124. The output manager 118 can also compensate the measured radial velocities based on a speed of the vehicle 102 to determine a compensated range rate for the box predictions 124. The output manager 118 can generate or provide the Doppler measurements for the detections 122 in a single cartesian map. The output manager 118 can extract the Doppler measurements of the detections 122 that correspond to the box predictions 124 from applying a fusion of the box predictions 124 and the radial velocity data obtained from the corresponding groups of the detections 122.

At 310, speed estimates for each predicted box are determined using the Doppler measurements associated with the groups of the potential detections determined for each of the predicted boxes. For example, the output manager 118 can determine the speed estimates 126 for the detections 122 using the Doppler measurements of the detections 122 that are localized to a location within or near an area defined by each of the box predictions 124. The speed estimates 126 can be determined for each box prediction 124, for example, using a least-squares algorithm to determine a cartesian speed that best matches the Doppler measurements. The speed estimates 126 can also be determined using an orientation of the box predictions 124 as predicted by the object detector model 116 and the compensated range rate.

At 312, the speed estimates for the predicted boxes are provided as an input to an autonomous-driving system or an assisted-driving system that operates the vehicle on a roadway. For example, the output manager 118 or the radar system 104 provides the speed estimates 126 for the box predictions 124 to the vehicle-based systems 200.

System Architectures

Figure 41:
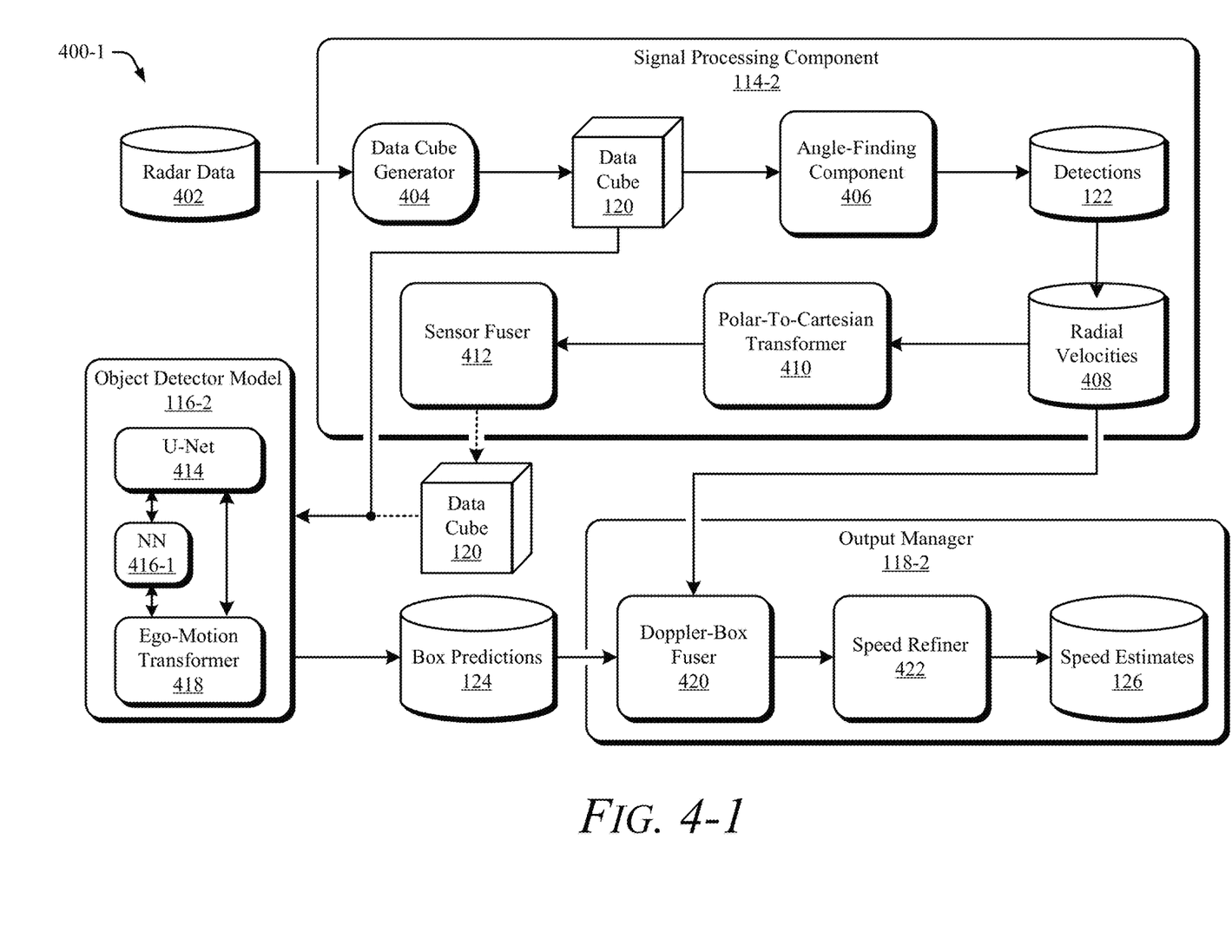

FIG. 4-1 illustrates a conceptual diagram of a computer architecture 400-1 including a partially-learned model of a radar system for speed estimates in accordance with techniques of this disclosure. The radar system may be the radar system 104 or 104-1 of FIG. 1 or 2, respectively. The computer architecture 400-1 may be implemented as hardware, software, or a combination thereof. For example, components of the computer architecture 400-1 may be distributed across hardware or software components of the vehicle 102 or 102-1. The computer architecture 400-1 is one example, and in other examples, illustrated components may be omitted, combined, duplicated, or arranged differently.

The computer architecture 400-1 includes a processor 114-2, which is an example of the processor 114. The processor 114-2 includes a data cube generator 404 configured to output the data cube 120 from radar data 402 (e.g., the radar data 402 is received from the MMIC 112-1). The data cube generator 404 can use a constant-false-alarm-rate (CFAR) level to suppress beamvectors in the radar data 402, resulting in a sparse data cube as the data cube 120. The data cube generator 404 or the processor 114-2 can interpolate missing antenna elements in a beamvector of the data cube 120. According to the radar equation in some implementations, the processor 114-2 can also scale bin values in the data cube 120. In other implementations, uncompressed data cubes can be used, and actors that rely on the data cube 120 (e.g., the object detector model 116-2) can use a bin-suppression method when processing the data cube 120.

The processor 114-2 can also use a fast Fourier transform (FFT) (e.g., a 2D FFT) to decompose the radar data 402 for each antenna into frequency components of the data cube 120. The processor 114-2 can then convert the frequency components into range and Doppler data. For example, the processor 114-2 may identify the detections 122 as peaks in an integrated range-Doppler map. An angle-finding component 406 processes peaks above a certain energy level (e.g., a local noise level) with FFT or DOA estimation algorithms to determine the direction of arrival of objects (e.g., the object 108) with a specific range-Doppler value. The angle-finding component 406 can be a multi-layer perceptron (MLP) that can share the same parameters across each beam vector of the data cube 120.

The processor 114-2 can generate radial velocity, range, and RCS values for the remaining peaks to form a detection list, which is shown as the detections 122. The data cube 120 can have several dimensions (e.g., r×θ×ṙ). For example, the processor 114-2 can determine Doppler measurements, including radial velocities 408, for individual or groups of the detections 122. The processor 114-2 may use subsequent layers (e.g., convolution layers) to filter the radar data 402. For example, the processor 114-2 can reduce the data cube 120 to two-dimensional maps of measured radial velocities (e.g., ṙ, with $\text{argmax}_{\dot{r}}(\bullet)$) and their respective magnitudes (e.g., mag), both planes an element of range and angle (e.g., $\dot{r}, \text{mag} \in \mathbb{R}^{r \times \theta}$), illustrated by Equations (1) and (2):

$$\dot{r} = \text{argmax}_{\dot{r}}(C(r;\theta,\dot{r})) \quad (1)$$

$$\text{mag} = \text{max}_{\dot{r}}(C(r;\theta,\dot{r})) \quad (2)$$

The processor 114-2 can also extract the energy (e.g., radar cross-section (RCS) values) from the data cube 120, rescale to output unit systems, generate detection point clouds, and generate object hypotheses.

The processor 114-2 also includes a polar-to-cartesian (P2C) transformer 410. The P2C transformer 410 can transform the radial-velocity maps of the radial velocities 408 to a cartesian coordinate system (e.g., (r, θ)→($x_{vcs}$, $y_{vcs}$)), where vcs represents the vehicle coordinate system (e.g., in a x direction and y direction from the vehicle 102). The cartesian coordinate system or the vehicle coordinate system may be a two-dimensional or three-dimensional cartesian coordinate system fixed at a reference point on or near the vehicle 102. The P2C transformer 410 can use the magnitude of the radial velocities 408 to determine a radial velocity for groups of the detections 122 in overlapping regions. For the conversion from the polar coordinate system to the cartesian coordinate system, each feature channel (e.g., Doppler feature channel) can be resampled to a cartesian grid using an interpolation technique, including, for example, bicubic interpolation, nearest neighbor interpolation, bilinear interpolation, and so forth. The P2C transformer 410 can use high resolutions in intermediate steps to avoid subsampling issues followed by max pooling resolution reduction. The result of the conversion may be a cartesian data cube output as the data cube.

The processor 114-2 can also include a sensor fuser 412. The sensor fuser 412 can apply max pooling to fuse the results of different radars. In this way, the sensor fuser 412 can generate feature planes combining the observation feature planes from each radar. The sensor fuser 412 can also use gated fusion or other complex sensor fusion networks to combine the observation feature planes from each radar. As such, the data cube 120 that is output from the processor 114-2 and used by the object detector model 116-2, as shown, can be received from the sensor fuser 412, directly from the data cube generator 404.

The computer architecture 400-1 also includes an example of the object detector model 116, shown as an object detector model 116-2 that is trained to receive the data cube 120. The object detector model 116 provides the box predictions 124 using machine-learning techniques applied to the information in the data cube 120. The object detector model 116-2 can operate on one or more radars and one or more time-steps, frames, or scans of the radars, and therefore, may process a series or multiples of the data cube 120. The object detector model 116-2 may operate directly on the radar data 402 received from the MMIC 112 in response to demodulating the radar return 110-2 (e.g., radar signals received by the processor 114-2 to produce the data cube 120) or after radar signal processing (e.g., in the form of the data cube 120), such as range-Doppler Fast Fourier Transform (FFT) processing, range-Doppler FFT processing with angle processing, and the like, which is typically performed before providing the radar data 402 to the object detector model 116-2 in data cube form.

The object detector model 116-2 is an example of the object detector model 116 trained, rather than programmed, using machine-learning techniques to infer the box predictions 124 directly from the data cube 120 provided as input. For example, the object detector model 116-2 may include one or more artificial neural networks, each comprising one or more complex (i.e., seemingly neurologically linked) layers of artificial neurons or nodes. Each node may be a processing element with one or more inputs from other nodes, which feed input to one or more additional nodes. Inputs to each node can be weighted and summed. The multiple layers of an artificial neural network may include an input layer and output layer, which together bind one or more hidden layers. The hidden layers perform predictive modeling and estimate relationships between the nodes' results on the output layer and inputted values to the nodes of the input layer. In the context of the object detector model 116-2, the data cube 120 fields populate the nodes on the input layer, and conveyed in the nodes of the output layer are one or more estimates of objects (e.g., the box predictions 124) (and their associated likelihood estimates or scores), which the hidden layers recognize by the trained logic.

To initiate the object detector model 116-2, training data is received by the object detector model 116-2 to configure and develop the layers, connections, and nodes (e.g., rules or logic for generating the box predictions 124). The training data can include known data cube representations of other vehicles or driving environments. The object detector model 116-2 can use the training data to adjust, connect, and populate the network's nodes to train the network to accurately classify aspects of the data cube as corresponding to one or more particular classes of objects included in the training data. Examples of driving environments trainable from the training data include neighborhood, in-town, highway, urban center, school zone, loading zone, refueling station, or other environments where speed estimates may indicate how to drive the vehicle 102 in the environment 100 safely.

The object detector model 116-2 may include a U-shaped network 414, a neural network 416-1, and an ego-motion transformer 418. The U-shaped network 414 can be used to detect objects (e.g., the object 108) from the data cube 120. The neural network 416-1 can combine multiple timesteps into one result. For example, the neural network 416-1 can be an ego-motion compensated recurrent network, including an LSTM or other types of recurrent networks. The ego-motion transformer 418 can compensate for the speed or motion of the host vehicle (e.g., the vehicle 102). The ego-motion transformer 418 can provide that the data that is combined in the neural network 416-1 or the U-shaped network 414 is provided in the same coordinate system even if data from various time steps is combined. The ego-motion transformer 418 can also perform ego-motion compensation of an output of the neural network 416-1 of a previous time step and input the result of the ego-motion compensation into the neural network 416-1 of the present time step. The ego-motion transformer 418 can also perform interpolation to avoid drift (e.g., due to an accumulation of location errors) in the location over time. The object detector model 116-2 outputs the box predictions 124 that represent bounding boxes for objects corresponding to groups of the detections 122.

The computer architecture 400-1 further includes an output manager 118-2, which includes a Doppler-box fuser 420 and a speed refiner 422. The box predictions 124 and the radial velocities 408 of the detections 122 are input to the Doppler-box fuser 420. Using the box predictions 124 from the object detector model 116-2 and the radial velocities 408 for the detections 122 that are within an area of the box predictions 124, the Doppler-box fuser 420 can extract the associated Doppler measurements of the detections, and convey the associated Doppler measurements as a single cartesian map. As a result, the Doppler-box fuser 420 can generate a list of measured radial velocities 408 ($\dot{r}$) for each of the box predictions 124. The radial velocities 408 can be compensated for the motion of the vehicle 102 to determine the compensated radial velocity (h.

The speed refiner 422 can determine a speed estimate 126 for each of the box predictions 124 by applying a least-squares algorithm to find the cartesian speed that matches the measurements best. This approach can lead to noisy results and flip the orientation. To overcome these issues, the speed refiner 422 can use the orientation of the box predictions 124 as predicted by the object detector model 116-2, to maintain the correct orientation. For example, the speed refiner 422 can include the predicted orientation in the least-squares algorithm along with the compensated radial velocities ($\dot{r}$) to maintain the correct orientation, which is represented in Equations (3) through (6).

$$Y_i = \dot{r} \qquad (3)$$

$$H_i = \begin{pmatrix} \cos\theta_{det,i} \\ \sin\theta_{det,i} \end{pmatrix}^T \begin{pmatrix} \cos\theta_{box} \\ \sin\theta_{box} \end{pmatrix} = \cos(\theta_{det,i} - \theta_{box}) \qquad (4)$$

$$\alpha = ((H^T H)^{-1} H^T) Y \qquad (5)$$

$$v = |\alpha| \begin{pmatrix} \cos\theta_{box} \\ \sin\theta_{box} \end{pmatrix} \qquad (6)$$

The computer architecture 400-1 directly incorporates the measured radial velocities 408 of the detections 122 into the machine-learned model based processing pipeline that acts on the data cube 120, in a non-learned fashion. This is accomplished by fusing the radial velocities 408 with the box predictions 124 generated by the neural network 416-1 of the object detector model 116-2. By fusing, the velocities 408 for the groups of the detections 122 that align Cartesianaly or radially, with an area of the box predictions 124 can be used to convey velocity rather than using velocity or speeds estimated from the data cube 120 directly, by the object detector model 116-2. In this way, the computer architecture 400-1 provides an improved speed regression and a means to incorporate radial velocity measurements into a neural network. The computer architecture 400-1 improves the transparency of the neural network by using the orientation of the box predictions 124 in the output manager 118-2.

FIG. 4-2 illustrates a conceptual diagram of another computer architecture 400-2 including a partially-learned model of a radar system for speed estimates in accordance with techniques of this disclosure. The radar system may be the radar system 104 or 104-1 of FIG. 1 or 2, respectively. The computer architecture 400-2 may be implemented as hardware, software, or a combination thereof. For example, components of the computer architecture 400-2 may be distributed across hardware or software components of the vehicle 102 or 102-1. The computer architecture 400-2 is one example, and in other examples, illustrated components may be omitted, combined, duplicated, or arranged differently. Aspects of the computer architecture 400-2 can be combined, for redundancy or for other purposes, with aspects of the computer architecture 400-1 in furtherance of enabling execution of partially-learned models for radar based speed estimates in a variety of vehicles. For example, in contrast to the computer architecture 400-1, the computer architecture 400-2 incorporates the angle-finding component 406 into the neural network (e.g., neural network 416-2) of the object detector model 116-3.

Figure 42:
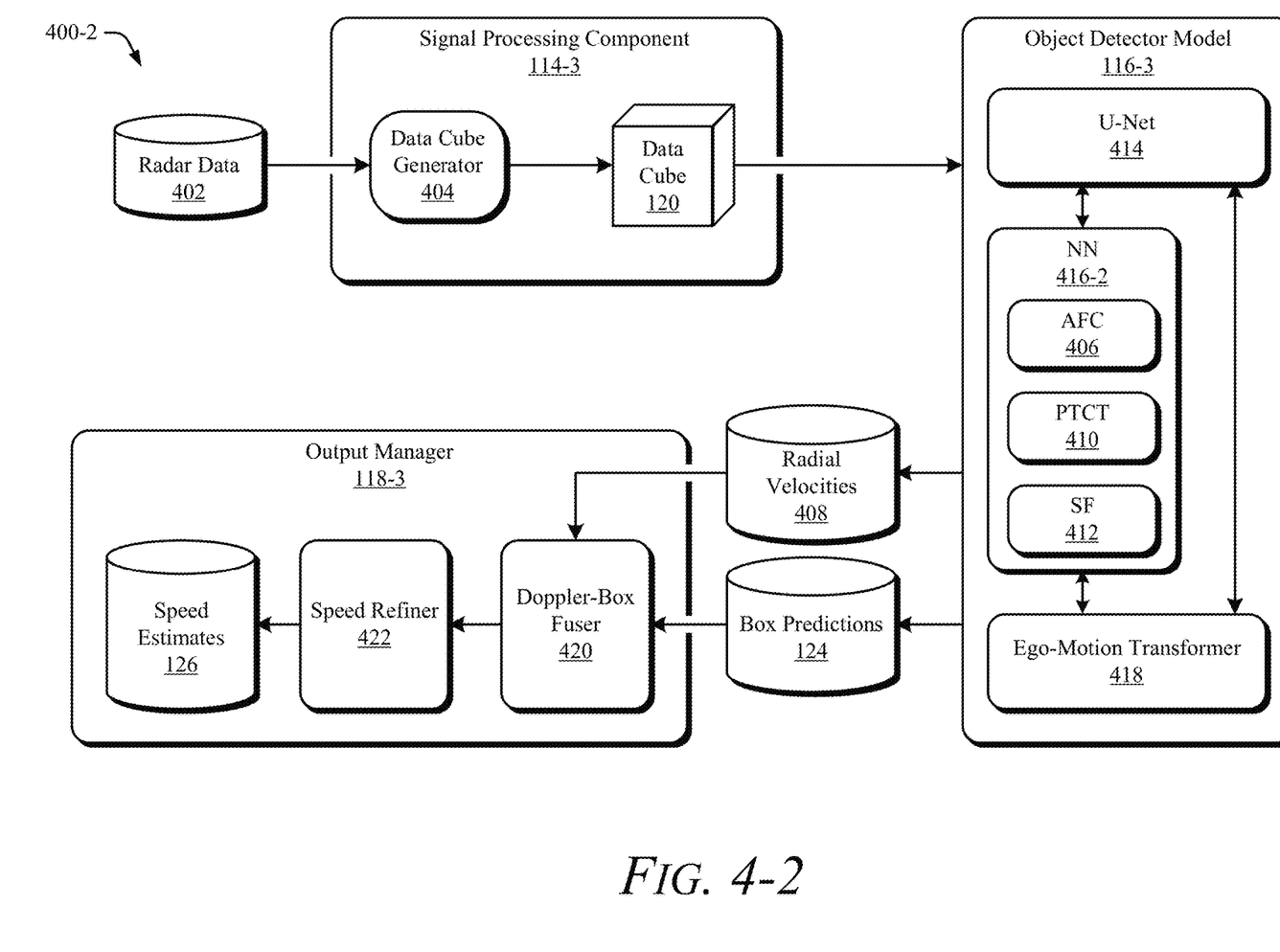

Similar to the computer architecture 400-1, the computer architecture 400-2 includes a processor 114-3, which is an example of the processor 114. The processor 114-3 includes the data cube generator 404 configured to output the data cube 120 from the radar data 402 (e.g., the radar data 402 is received from the MMIC 112-1).

Similar to the processor 114-2, the processor 114-3 can also use a fast Fourier transform (FFT) (e.g., a 2D FFT) to decompose the radar data 402 for each antenna into frequency components of the data cube 120. The processor 114-3 can then convert the frequency components into range and Doppler data. For example, the processor 114-3 may identify the detections 122 as peaks in an integrated range-Doppler map.

The computer architecture 400-2 also includes an example of the object detector model 116, shown as an object detector model 116-3 that is trained to receive the data cube 120. The object detector model 116-3 provides the box predictions 124 using machine-learning techniques applied to the information in the data cube 120. The object detector model 116-3 can operate on radar data obtained from one or multiple radars, and across one or multiple time-steps, frames, or scans, and therefore, may process a series or multiples of the data cube 120. The object detector model 116-3 may operate directly on the radar data 402 received from the MMIC 112 in response to demodulating the radar return 110-2 (e.g., radar signals received by the processor 114-2 to produce the data cube 120) or after radar signal processing (e.g., in the form of the data cube 120), such as range-Doppler Fast Fourier Transform (FFT) processing, range-Doppler FFT processing with angle processing, and the like.

In the computer architecture 400-2, the angle-finding component 406 is integrated into or is a part of the neural network 416-2. The neural network 416-2 can also include the polar-to-cartesian (P2C) transformer 410 and the sensor fuser 412, as shown.

By integrating the angle-finding component 406 in the neural network 416-2, the angle-finding component 406 may be able to more quickly determine the direction of arrival of objects (e.g., the object 108) with a specific range-Doppler value than when arranged according to the computer-architecture 400-1. The angle-finding component 406 can be a multi-layer perceptron (MLP) that can share the same parameters across each beam vector of the data cube 120. The neural network 416-2 or the angle-finding component 406 can form a detection list based on radial velocity, range, and RCS values for detected peaks. The neural network 416-2 or the angle-finding component 406 can also extract the energy (e.g., radar cross-section (RCS) values) from the data cube 120, rescale to output unit systems, generate detection point clouds, and generate object hypotheses.

The neural network 416-2 or the angle-finding component 406 can determine Doppler measurements, including the radial velocities 408, for individual or groups of the detections. The neural network 416-2 or the angle-finding component 406 may use subsequent layers (e.g., convolution layers) to filter the radar data 402. For example, the data cube 120 can have several dimensions (e.g., r×θ×ṙ). The neural network 416-2 or the angle-finding component 406 can reduce the data cube 120 to two-dimensional maps of measured radial velocities (e.g., ṙ, with $\text{argmax}_{\dot{r}}(\bullet)$) and their respective magnitudes (e.g., mag), both planes an element of range and angle (e.g., ṙ, mag∈ $\mathbb{R}^{r×\theta}$) as previously illustrated by Equations (1) and (2).

The object detector model 116-3 is an example of the object detector model 116 trained, rather than programmed, using machine-learning techniques to infer the box predictions 124 directly from the data cube 120 provided as input. For example, the object detector model 116-3 may include one or more artificial neural networks, each comprising one or more complex (i.e., seemingly neurologically linked) layers of artificial neurons or nodes. Each node may be a processing element with one or more inputs from other nodes, which feed input to one or more additional nodes. Inputs to each node can be weighted and summed. The multiple layers of an artificial neural network may include an input layer and output layer, which together bind one or more hidden layers. The hidden layers perform predictive modeling and estimate relationships between the nodes' results on the output layer and inputted values to the nodes of the input layer. In the context of the object detector model 116-3, the data cube 120 fields populate the nodes on the input layer, and conveyed in the nodes of the output layer are one or more estimates of objects (e.g., the box predictions 124) (and their associated likelihood estimates or scores), which the hidden layers recognize by the trained logic.

To initiate the object detector model 116-3, training data is received by the object detector model 116-3 to configure and develop the layers, connections, and nodes (e.g., rules or logic for generating the box predictions 124). The training data can include known data cube representations of other vehicles or driving environments. The object detector model 116-3 can use the training data to adjust, connect, and populate the network's nodes to train the network to accurately classify aspects of the data cube as corresponding to one or more particular classes of objects included in the training data. Examples of driving environments trainable from the training data include neighborhood, in-town, highway, urban center, school zone, loading zone, refueling station, or other environments where speed estimates may indicate how to drive the vehicle 102 in the environment 100 safely.

Similar to the object detector model 116-2, the object detector model 116-3 may also include the U-shaped network 414 and the ego-motion transformer 418. The U-shaped network 414 can be used to detect objects (e.g., the object 108) from the data cube 120. The neural network 416-2 can combine multiple timesteps into one result. For example, the neural network 416-2 can be an ego-motion compensated recurrent network, including an LSTM or other types of recurrent networks. The object detector model 116-3 outputs the box predictions 124 that represent bounding boxes for objects corresponding to groups of the detections.

Similar to the computer architecture 400-1, the computer architecture 400-2 further includes the output manager 118-3, which includes the Doppler-box fuser 420 and the speed refiner 422. The box predictions 124 and the radial velocities 408 are input to the Doppler-box fuser 420. Using the box predictions 124 from the object detector model 116-3 and the radial velocities 408 for the detections that are within an area of the box predictions 124, the Doppler-box fuser 420 can extract the associated Doppler measurements of the detections, and convey the associated Doppler measurements as a single cartesian map. As a result, the Doppler-box fuser 420 can generate a list of measured radial velocities 408 (ṙ) for each of the box predictions 124. The radial velocities 408 can be compensated for the motion of the vehicle 102 to determine the compensated radial velocity ($\dot{\tilde{r}}$).

The speed refiner 422 can determine a speed estimate 126 for each of the box predictions 124 by applying a least-squares algorithm to find the cartesian speed that matches the measurements best. This approach can lead to noisy results and flip the orientation. To overcome these issues, the speed refiner 422 can use the orientation of the box predictions 124 as predicted by the object detector model 116-3, to maintain the correct orientation. For example, the speed refiner 422 can include the predicted orientation in the least-squares algorithm along with the compensated radial velocities ($\dot{\tilde{r}}$) to maintain the correct orientation, which was represented by Equations (3) through (6).

Figure 5:
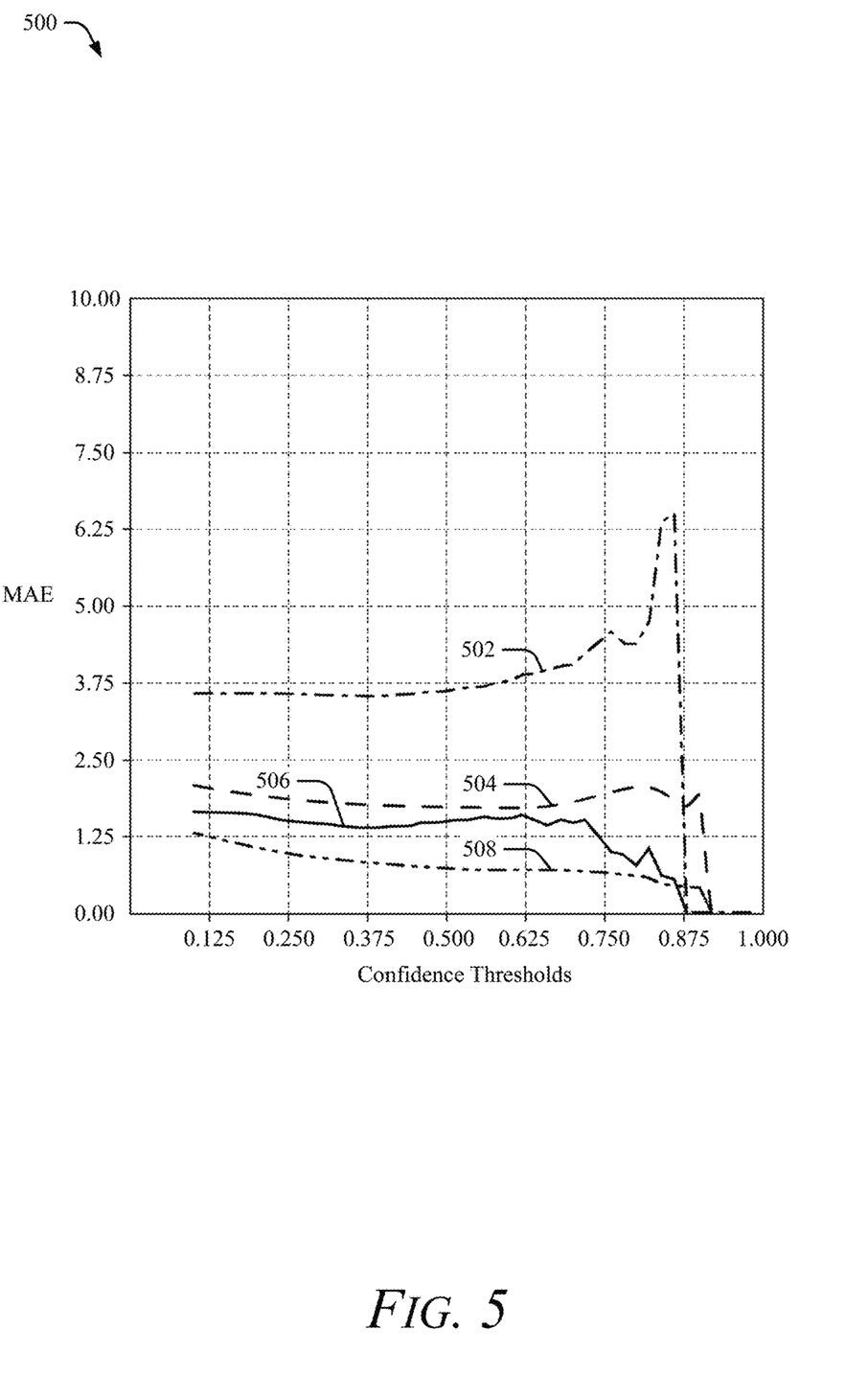
FIG. 5 illustrates example diagrams of mean absolute error (MAE) of speed estimates output by models for different confidence thresholds.

The computer architecture 400-2 directly incorporates the measured radial velocities 408 of the detections 122 into the machine-learned model-based processing pipeline that acts on the data cube 120, in a non-learned fashion. This is accomplished by fusing the radial velocities 408 with the box predictions 124 generated by the neural network 416-2 of the object detector model 116-2. By fusing, the radial velocities 408 for the groups of the detections that align Cartesianaly or radially with an area of the box predictions 124 can be used to convey velocity rather than using velocity or speeds estimated from the data cube 120 directly by the object detector model 116-3. In this way, the computer architecture 400-2 provides an improved speed regression and a means to incorporate radial velocity measurements into a neural network. The computer architecture 400-2 improves the accuracy of the neural network by using the orientation of the box predictions 124 in the output manager 118-3. FIG. 5 illustrates example diagrams 500 of mean absolute error (MAE) of speed estimates output by models for different confidence thresholds. Diagrams 502 and 506 depict the MAE of speed estimates provided by models for trucks. Diagrams 504 and 508 illustrate the MAE of speed estimates output by models for cars. Diagram 500 compares the MAE of speed estimates provided by the described partially-learned model (e.g., of that described in FIG. 4-2) in diagrams 506 and 508 in contrast to a model that does not incorporate radial velocity measurements for the speed regression in diagrams 502 and 504. As illustrated, the described partially-learned model can significantly reduce the MAE of speed estimates for detections, resulting in improved and safer autonomous-driving and assisted-driving systems.

ADDITIONAL EXAMPLES

Some additional examples of radar tracking with model predictions augmented by radar detections include the following:

Example 1. A method, comprising: generating, from radar signals, a data cube that represents an environment of a vehicle; determining, based on the radar signals or the data cube, radial-velocity maps of potential detections in the environment of the vehicle, the radial-velocity maps including radial velocity and Doppler data for the potential detections; determining, using a model applied to the data cube, predicted boxes; determining Doppler measurements associated with groups of the potential detections associated with each of the predicted boxes; determining, using the Doppler measurements associated with the groups of the potential detections determined for each of the predicted boxes, speed estimates for each of the predicted boxes; and providing the speed estimates for the predicted boxes as an input to an autonomous-driving system or an assisted-driving system that operates the vehicle on a roadway.

Example 2. The method of example 1, wherein determining of the radial-velocity maps of potential detections in the environment of the vehicle is performed by the model.

Example 3. The method of any one of the preceding examples, wherein the data cube includes at least three dimensions, the at least three dimensions including at least range data, angle data, and radial velocity data for the potential detections.

Example 4. The method of any one of the preceding examples, wherein the radial-velocity maps are two-dimensional and include at least maximum values and maximum absolute values.

Example 5. The method of any one of the preceding examples, the method further comprising: performing a polar to cartesian transformation on the radial-velocity maps of the potential detections resulting in transformed radial-velocity maps; and generating a fusion of coordinates for the transformed radial-velocity maps, the fusion of coordinates maintaining a radial-velocity value with a largest magnitude for a given angle for each of the potential detections.

Example 6. The method of any one of the preceding examples, wherein the model comprises a neural network, a convolutional neural network, a recurrent neural network, a modular neural network, or a long short-term memory network.

Example 7. The method of any one of the preceding examples, wherein the Doppler measurements result in a list of measured radial velocities for the predicted boxes output by the model.

Example 8. The method of example 7, wherein the Doppler measurements are provided in a single cartesian map and extracted from a fusion of the predicted boxes and the radial velocity data.

Example 9. The method of example 7, the method further comprising compensating the measured radial velocities based on a speed of the vehicle to determine a compensated range rate for the predicted boxes.

Example 10. The method of example 9, wherein the speed estimates are determined using a least-squares algorithm to determine a cartesian speed that best matches the Doppler measurements.

Example 11. The method of example 10, wherein the speed estimates are also determined using an orientation of the predicted boxes as predicted by the model and the compensated range rate.

Example 12. The method of any one of the preceding examples, wherein the radar signals are generated by a radar system that is configured to be installed on an automobile.

Example 13. A radar system comprising one or more processors configured to: generate, from radar signals, a data cube that represents an environment of a vehicle; determine, based on the radar signals or the data cube, radial-velocity maps of potential detections in the environment of the vehicle, the radial-velocity maps including radial velocity and Doppler data for the potential detections; determine, using a model applied to the data cube, predicted boxes; determine Doppler measurements associated with groups of the potential detections associated with each of the predicted boxes; determine, using the Doppler measurements associated with the groups of the potential detections determined for each of the predicted boxes, speed estimates for each of the predicted boxes; and provide the speed estimates for the predicted boxes as an input to an autonomous-driving system or an assisted-driving system that operates the vehicle on a roadway.

Example 14. The radar system of example 13, wherein a determination of the radial-velocity maps of potential detections in the environment of the vehicle is performed by the model.

Example 15. The radar system of any one of examples 13 or 14, wherein the data cube includes at least three dimensions, the at least three dimensions including at least range data, angle data, and radial velocity data for the potential detections.

Example 16. The radar system of any one of examples 13 through 15, wherein the radial-velocity maps are two-dimensional and include at least maximum values and maximum absolute values.

Example 17. The radar system of any one of examples 13 through 16, the one or more processors further configured to: perform a polar to cartesian transformation on the radial-velocity maps of the potential detections resulting in transformed radial-velocity maps; and generate a fusion of coordinates for the transformed radial-velocity maps, the fusion of coordinates maintaining a radial-velocity value with a largest magnitude for a given angle for each of the potential detections.

Example 18. The radar system of any one of examples 13 through 17, wherein the model comprises a neural network, a convolutional neural network, a recurrent neural network, a modular neural network, or a long short-term memory network.

Example 19. The radar system of any one of examples 13 through 18, wherein the Doppler measurements result in a list of measured radial velocities for the predicted boxes output by the model.

Example 20. The radar system of example 19, wherein the Doppler measurements are provided in a single cartesian map and extracted from a fusion of the predicted boxes and the radial velocity data.

Example 21. The radar system of example 19, wherein the one or more processors further configured to compensate the measured radial velocities based on a speed of the vehicle to determine a compensated range rate for the predicted boxes.

Example 22. A non-transitory computer-readable medium comprising instructions that, when executed, cause one or more processors of a radar system to: generate, from radar signals, a data cube that represents an environment of a vehicle; determine, based on the radar signals or the data cube, radial-velocity maps of potential detections in the environment of the vehicle, the radial-velocity maps including radial velocity and Doppler data for the potential detections; determine, using a model applied to the data cube, predicted boxes; determine Doppler measurements associated with groups of the potential detections associated with each of the predicted boxes; determine, using the Doppler measurements associated with the groups of the potential detections determined for each of the predicted boxes, speed estimates for each of the predicted boxes; and provide the speed estimates for the predicted boxes as an input to an autonomous-driving system or an assisted-driving system that operates the vehicle on a roadway.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to radar systems, problems associated with object recognition can occur in other systems (e.g., image systems, lidar systems, ultrasonic systems) that identify and process tracks from a variety of sensors. Therefore, although described as a way to improve radar tracking, the techniques of the foregoing description can be adapted and applied to other problems to effectively detect and track objects in a scene using other types of object trackers.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method, comprising:
   generating, from radar signals, a data cube that represents an environment of a vehicle;
   determining, based on the radar signals or the data cube, radial-velocity maps of potential detections in the environment of the vehicle, the radial-velocity maps including radial velocity data and Doppler data for the potential detections;
   determining, using a model applied to the data cube, predicted boxes corresponding to respective groups of the potential detections, the predicted boxes including at least modeled speed estimates associated with each of the predicted boxes;
   determining Doppler measurements associated with groups of the potential detections associated with each of the predicted boxes, the Doppler measurements including, for each of the box predictions, a list of measured radial velocities produced independent from an output from the model such that the list of measured radial velocities are associated with the groups of the potential detections determined for each of the box predictions;
   determining, using the Doppler measurements associated with the groups of the potential detections determined for each of the predicted boxes, improved speed estimates for each of the predicted boxes by fusing ones of the corresponding measured radial velocities that align with areas of the box predictions generated using the model to replace the modeled speed estimates from the data cube with the improved speed estimates determined from the measured radial velocities; and
   providing the improved speed estimates for the predicted boxes as an input to an autonomous-driving system or an assisted-driving system that operates the vehicle on a roadway.

2. The method of claim 1, wherein determining of the radial-velocity maps of the potential detections in the environment of the vehicle is performed by the model.

3. The method of claim 1, wherein the data cube includes at least three dimensions, the at least three dimensions including at least range data, angle data, and radial velocity data for the potential detections.

4. The method of claim 1, the method further comprising:
   performing a polar to cartesian transformation on the radial-velocity maps of the potential detections resulting in transformed radial-velocity maps; and
   generating a fusion of coordinates for the transformed radial-velocity maps, the fusion of coordinates maintaining a radial-velocity value with a largest magnitude for a given angle for each of the potential detections.

5. The method of claim 1, wherein the model comprises a neural network, a convolutional neural network, a recurrent neural network, a modular neural network, or a long short-term memory network.

6. The method of claim 1, further comprising:
   compensating the measured radial velocities based on a speed of the vehicle to determine a compensated range rate for the predicted boxes.

7. The method of claim 6, wherein the improved speed estimates are determined using a least-squares algorithm to determine a cartesian speed that best matches the Doppler measurements.

8. The method of claim 7, wherein the improved speed estimates are also determined using an orientation of the predicted boxes as predicted by the model and the compensated range rate.

9. The method of claim 1, wherein the radar signals are generated by a radar system that is configured to be installed on an automobile.

10. A radar system comprising one or more processors configured to:
    generate, from radar signals, a data cube that represents an environment of a vehicle;
    determine, based on the radar signals or the data cube, radial-velocity maps of potential detections in the environment of the vehicle, the radial-velocity maps including radial velocity data and Doppler data for the potential detections;
    determine, using a model applied to the data cube, predicted boxes corresponding to respective groups of the potential detections, the predicted boxes including at least modeled speed estimates associated with each of the predicted boxes;
    determine Doppler measurements associated with groups of the potential detections associated with each of the predicted boxes, the Doppler measurements including, for each of the box predictions, a list of measured radial velocities produced independent from an output from the model such that the list of measured radial velocities are associated with the groups of the potential detections determined for each of the box predictions;
    determine, using the Doppler measurements associated with the groups of the potential detections determined for each of the predicted boxes, improved speed estimates for each of the predicted boxes by fusing ones of the corresponding measured radial velocities that align with areas of the box predictions generated using the model to replace the modeled speed estimates from the data cube with the improved speed estimates determined from the measured radial velocities; and provide the improved speed estimates for the predicted boxes as an input to an autonomous-driving system or an assisted-driving system that operates the vehicle on a roadway.

11. The radar system of claim 10, wherein a determination of the radial-velocity maps of the potential detections in the environment of the vehicle is performed by the model.

12. The radar system of claim 10, wherein the data cube includes at least three dimensions, the at least three dimensions including at least range data, angle data, and radial velocity data for the potential detections.

13. The radar system of claim 10, the one or more processors further configured to:

perform a polar to cartesian transformation on the radial-velocity maps of the potential detections resulting in transformed radial-velocity maps; and generate a fusion of coordinates for the transformed radial-velocity maps, the fusion of coordinates maintaining a radial-velocity value with a largest magnitude for a given angle for each of the potential detections.

14. The radar system of claim 10, wherein the model comprises a neural network, a convolutional neural network, a recurrent neural network, a modular neural network, or a long short-term memory network.

15. A non-transitory computer-readable medium comprising instructions that, when executed, cause one or more processors of a radar system to:

generate, from radar signals, a data cube that represents an environment of a vehicle;

determine, based on the radar signals or the data cube, radial-velocity maps of potential detections in the environment of the vehicle, the radial-velocity maps including radial velocity data and Doppler data for the potential detections;

determine, using a model applied to the data cube, predicted boxes corresponding to respective groups of the potential detections, the predicted boxes including at least modeled speed estimates associated with each of the predicted boxes;

determine Doppler measurements associated with groups of the potential detections associated with each of the predicted boxes, the Doppler measurements including, for each of the box predictions, a list of measured radial velocities produced independent from an output from the model such that the list of measured radial velocities are associated with the groups of the potential detections determined for each of the box predictions;

determine, using the Doppler measurements associated with the groups of the potential detections determined for each of the predicted boxes, improved speed estimates for each of the predicted boxes by fusing ones of the corresponding measured radial velocities that align with areas of the box predictions generated using the model to replace the modeled speed estimates from the data cube with the improved speed estimates determined from the measured radial velocities; and provide the improved speed estimates for the predicted boxes as an input to an autonomous-driving system or an assisted-driving system that operates the vehicle on a roadway.

* * * * *